United States Patent
Lo et al.

(10) Patent No.: US 12,463,628 B2
(45) Date of Patent: Nov. 4, 2025

(54) DUTY CYCLE CORRECTION METHOD AND DUTY CYCLE CORRECTION SYSTEM

(71) Applicant: MACRONIX International Co., Ltd., Hsinchu (TW)

(72) Inventors: Su-Chueh Lo, Hsinchu (TW); Jhen-Sheng Chih, Hsinchu County (TW)

(73) Assignee: MACRONIX International Co., Ltd., Hsinchu (TW)

( * ) Notice: Subject to any disclaimer, the term of this patent is extended or adjusted under 35 U.S.C. 154(b) by 92 days.

(21) Appl. No.: 18/475,244

(22) Filed: Sep. 27, 2023

(65) Prior Publication Data

US 2025/0105832 A1    Mar. 27, 2025

(51) Int. Cl.
   *H03K 5/15*     (2006.01)
   *G11C 7/22*     (2006.01)
   *H03K 5/156*    (2006.01)

(52) U.S. Cl.
   CPC .......... *H03K 5/1565* (2013.01); *G11C 7/222* (2013.01)

(58) Field of Classification Search
   CPC ............................ H03K 5/1565; G11C 7/222
   See application file for complete search history.

(56) References Cited

U.S. PATENT DOCUMENTS

| | | | |
|---|---|---|---|
| 5,757,218 A * | 5/1998 | Blum | H03K 5/05 327/175 |
| 9,590,628 B2 | 3/2017 | Kang et al. | |
| 2004/0161068 A1* | 8/2004 | Zerbe | H03L 7/087 375/355 |
| 2023/0118731 A1* | 4/2023 | Balasubrahmanyam | H03K 3/017 365/185.17 |

FOREIGN PATENT DOCUMENTS

CN      114360598      4/2022

OTHER PUBLICATIONS

"Office Action of Taiwan Counterpart Application", issued on Aug. 12, 2024, pp. 1-5.
Dao-Hyun Kim et al., "A 1Tb 4b/cell NAND Flash Memory with tPROG=2ms, tR=110μs and 1.2Gb/s High-Speed 10 Rate", 2020 IEEE International Solid-State Circuits Conference, Feb. 18, 2020, pp. 218-220, Session 13.
Kanak Agarwal et al., "A Duty-Cycle Correction Circuit for High-Frequency Clocks", 2006 Symposium on VLSI Circuits, 2006. Digest of Technical Papers, Jun. 15-17, 2006, pp. 1-2.

* cited by examiner

*Primary Examiner* — Daniel C Puentes
(74) *Attorney, Agent, or Firm* — J.C. PATENTS

(57) ABSTRACT

A duty cycle correction method and a duty cycle correction system, adapted for correcting a duty cycle of a clock signal by using a duty cycle corrector (DCC) in a high-capacity and high-performance semiconductor product such as a 3D NAND flash, are provided. In the method, training is performed on the DCC to correct the clock signal, and a training result is recorded after the training is finished; and the DCC is updated by the recorded training result before a next toggle of the clock signal.

18 Claims, 5 Drawing Sheets

DUTY CYCLE CORRECTION METHOD AND DUTY CYCLE CORRECTION SYSTEM

BACKGROUND

Technical Field

The disclosure relates to a correction method and a correction system, and particularly relates to a duty cycle correction method and a duty cycle correction system.

Description of Related Art

In high-speed applications, the clock signal can be distorted by external instrumentation, external packaging, and internal clock paths. At this time, a duty cycle corrector (DCC) is needed to solve the problem. With the main function being to correct the duty cycle of the input clock and provide an output clock of approximately 50% of the duty cycle, the DCC is widely used in circuits that need to operate simultaneously on the rising edge and the falling edge of the clock signal such as double data rate SDRAM (DDR SDRAM), double-sampling ADC, delay locked loop (DLL), and phase locked loop (PLL). The performance of the DCC often depends on the symmetry of the positive and negative half cycles of the reference clock.

FIG. 1A and FIG. 1B are schematic diagrams of execution timing of the conventional training of the DCC. Referring to FIG. 1A, the conventional training method of the DCC is to perform training on the DCC after receiving the DCC command and update the DCC training result at time T1 after the DCC training is finished, and then perform data out after receiving the data out command. This method takes a long time. Referring to FIG. 1B, another training method of the DCC is to sequentially perform training of the DCC and data out after receiving the data out command, and simultaneously update the DCC training result and perform the data out at time T2 after the DCC training is finished.

The duty cycle of the output clock changes according to different DCC training results. The update timing of the training result is important, because the logic function could fail due to the change of the clock duty cycle.

SUMMARY

In view of the above, the disclosure provides a duty cycle correction method and a duty cycle correction system, which can reduce the change of the duty cycle during a toggle of the clock signal.

The disclosure provides a duty cycle correction method, which is adapted for correcting the duty cycle of a clock signal by using a duty cycle corrector (DCC). The method includes the following steps. Training is performed on the duty cycle corrector to correct the clock signal, and a training result is recorded after the training is finished. The duty cycle corrector is updated by the recorded training result before a next toggle of the clock signal.

In an embodiment of the disclosure, the method further includes performing data out after performing the training on the duty cycle corrector and recording the training result.

In an embodiment of the disclosure, updating the duty cycle corrector by the recorded training result before the next toggle of the clock signal includes, when receiving a next data out command, updating the duty cycle corrector by the recorded training result before performing the training on the duty cycle corrector to correct the clock signal.

In an embodiment of the disclosure, performing the training on the duty cycle corrector to correct the clock signal and recording the training result after the training is finished includes performing the training of the duty cycle corrector and data out simultaneously, and recording the training result after the training and the data out are finished.

In an embodiment of the disclosure, updating the duty cycle corrector by the recorded training result before the next toggle of the clock signal includes, when receiving a next data out command, updating the duty cycle corrector by the recorded training result before performing the training of the duty cycle corrector and the data out.

In an embodiment of the disclosure, performing the training of the duty cycle corrector and the data out simultaneously and recording the training result after the training and the data out are finished further includes updating the duty cycle corrector by the recorded training result.

In an embodiment of the disclosure, the method further includes, in response to a power being turned on, performing the training on the duty cycle corrector to correct the clock signal, and recording an initial training result after the training is finished, and when receiving a data out command, updating the duty cycle corrector by the recorded initial training result before the toggle of the clock signal.

In an embodiment of the disclosure, performing the training on the duty cycle corrector to correct the clock signal includes performing the training on the duty cycle corrector to output an output clock of approximately 50% of the duty cycle.

In an embodiment of the disclosure, performing the training on the duty cycle corrector to output the output clock of approximately 50% of the duty cycle includes, when the clock signal being input to the duty cycle corrector, comparing pulse widths generated by delay with each other, generating a trim value of the duty cycle according to comparison results, and adjusting the duty cycle of the output clock output by the duty cycle corrector according to the trim value, so that the duty cycle is trimmed to approximately 50%.

In an embodiment of the disclosure, the duty cycle corrector is configured in a semiconductor product to correct the duty cycle of the clock signal provided to the semiconductor product.

The disclosure provides a duty cycle correction system, which includes a duty cycle corrector, a storage apparatus, and a control circuit. The duty cycle corrector is configured to correct the duty cycle of the clock signal. The storage apparatus is configured to record the training result of the duty cycle corrector. The control circuit is configured to perform training on the duty cycle corrector to correct the clock signal and record the training result in the storage apparatus after the training is finished, and update the duty cycle corrector by the training result recorded in the storage apparatus before a next toggle of the clock signal.

In an embodiment of the disclosure, the control circuit further performs data out of the duty cycle corrector after performing training on the duty cycle corrector and recording the training result.

In an embodiment of the disclosure, the control circuit includes updating the duty cycle corrector by the recorded training result before performing training on the duty cycle corrector to correct the clock signal when receiving a next data out command.

In an embodiment of the disclosure, the control circuit includes performing training of the duty cycle corrector and data out simultaneously, and recording the training result in the storage apparatus after the training and data out are finished.

In an embodiment of the disclosure, the control circuit includes updating the duty cycle corrector by the recorded training result before performing training of the duty cycle corrector and data out of the duty cycle corrector when receiving a next data out command.

In an embodiment of the disclosure, the control circuit further updates the duty cycle corrector by the recorded training result after the training result is recorded.

In an embodiment of the disclosure, when the power is turned on, the control circuit further performs training on the duty cycle corrector to correct the clock signal, records the initial training result after the training is finished, and updates the duty cycle corrector by the recorded initial training result before a next toggle of the clock signal when receiving the data out command.

In an embodiment of the disclosure, the control circuit includes performing training on the duty cycle corrector to output an output clock of approximately 50% of the duty cycle.

In an embodiment of the disclosure, the duty cycle corrector includes a sensing circuit and an adjustment circuit, in which when the clock signal is input to the adjustment circuit, the sensing circuit compares pulse widths generated by delay with each other and generates the trim value of the duty cycle according to comparison results. The adjustment circuit adjusts the duty cycle of the output clock output according to the trim value, so that the duty cycle is trimmed to approximately 50%.

To make the foregoing features and advantages of the disclosure more comprehensible, embodiments of the accompanying drawings are described in detail below.

DESCRIPTION OF THE EMBODIMENTS

According to the embodiments of the disclosure, the update timing of the training result of the duty cycle corrector (DCC) is trimmed to reduce the change of the duty cycle during a toggle of the clock, thereby reducing the risk of chip function failure. The update timing includes a timing before performing training on the DCC, a timing after performing training and data out of the DCC, or a timing before performing a next training of the DCC and data out, in which the previous training result of the DCC is recorded and used for the next update.

Figure 1A:
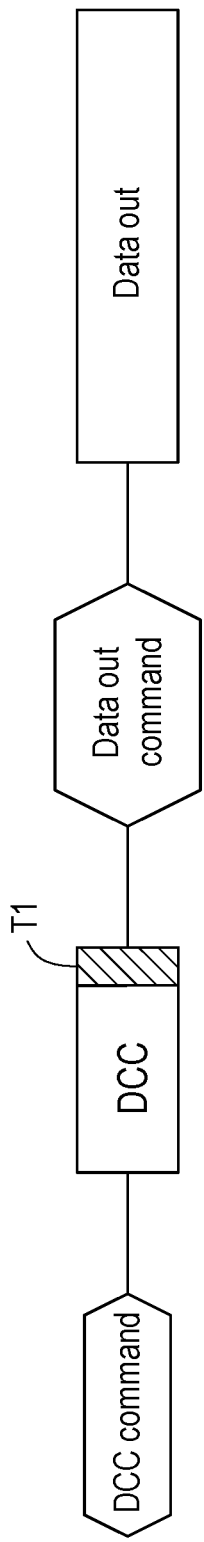
FIG. 1A and FIG. 1B are schematic diagrams of performing timing of the conventional training of the DCC.
Figure 1B:
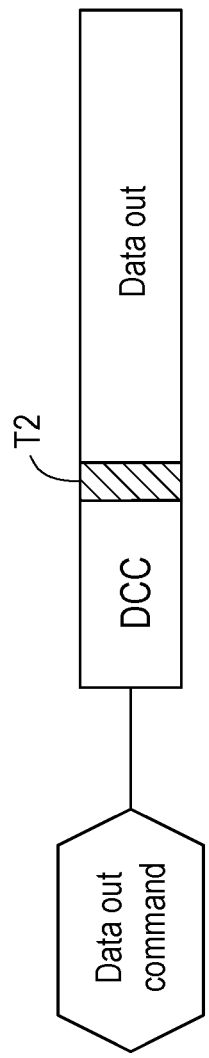
Figure 2:
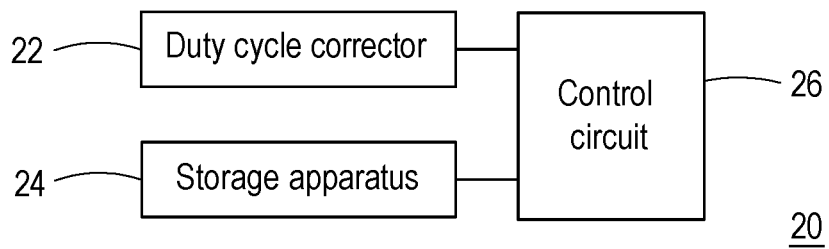
FIG. 2 is a block diagram of a duty cycle correction system according to an embodiment of the disclosure.

FIG. 2 is a block diagram of a duty cycle correction system according to an embodiment of the disclosure. Referring to FIG. 2, a duty cycle correction system 20 of this embodiment includes a duty cycle corrector 22, a storage apparatus 24, and a control circuit 26.

The duty cycle corrector 22 is configured to correct the duty cycle of the input clock so as to make the duty cycle of the output clock closer to 50% than the duty cycle of the input clock. In some embodiments, the duty cycle corrector 22 includes a sensing circuit and an adjustment circuit. When the input clock is provided to the adjustment circuit, the adjustment circuit adjusts the delay to generate various pulses and provides the same to the sensing circuit for comparison. The pulse widths generated by the delay are compared with each other, and different training results are obtained according to different comparison results. This trim value is provided to the adjustment circuit, which will be used to adjust the duty cycle of the output clock, so that the duty cycle of the output clock can be trimmed to approximately 50%.

In some embodiments, the duty cycle corrector 22 is configured in a high-capacity and high-performance semiconductor product such as a 3D NAND flash to correct the duty cycle of the clock signal provided to the semiconductor product. The semiconductor product is, for example, a non-volatile/volatile memory such as a flash memory, a dynamic random access memory (DRAM), or a logic device such a as microcontroller, and the disclosure is not limited thereto.

The storage apparatus 24 is, for example, an internal circuit or a memory such as a static random access memory (SRAM), a dynamic random access memory (DRAM), an NAND flash memory, an NOR flash memory, or a ReRAM having a 2D or 3D structure, and the disclosure is not limited thereto. The storage apparatus 24 is configured to record the training result of the duty cycle corrector 22.

The control circuit 26 is, for example, an external controller or an internal logic circuit, connected to the duty cycle corrector 22 and the storage apparatus 24, and configured to control the operation of the duty cycle corrector 22. The controller is, for example, a microcontroller, a microprocessor, or other processors, and the disclosure is not limited thereto.

Figure 3:
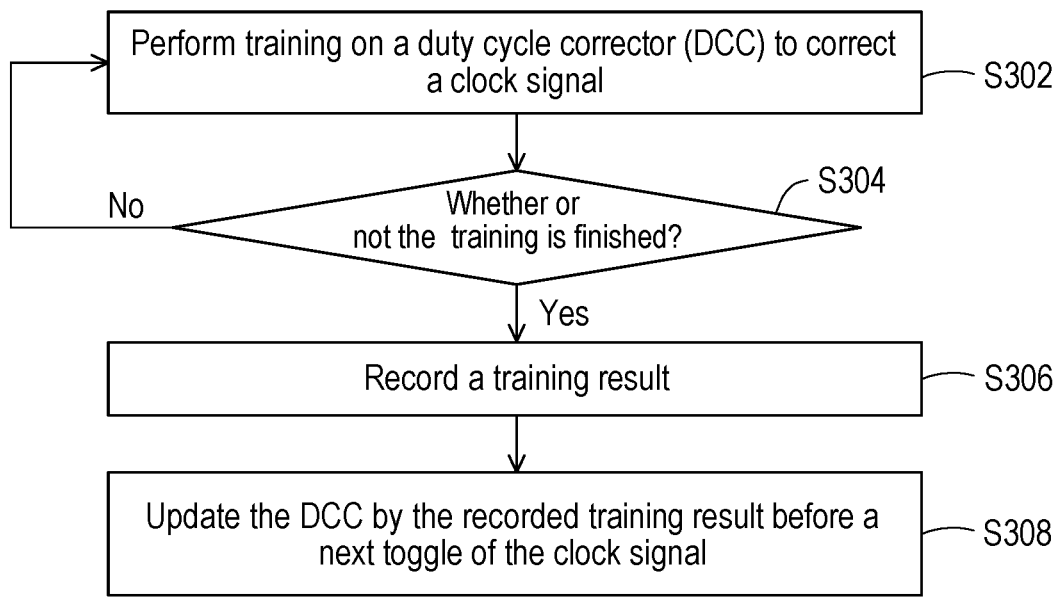
FIG. 3 is a flowchart of a duty cycle correction method according to an embodiment of the disclosure.

FIG. 3 is a flowchart of a duty cycle correction method according to an embodiment of the disclosure. Referring to FIG. 2 and FIG. 3, the method of this embodiment is adapted for the duty cycle correction system 20, and the detailed steps of the duty cycle correction method of this embodiment will be described below with reference to various circuits and components of the duty cycle correction system 20.

First, in Step S302, the control circuit 26 performs training on the duty cycle corrector 22 to correct the clock signal.

In Step S304, the control circuit 26 determines whether the training of the duty cycle corrector 22 is finished. If the training of the duty cycle corrector 22 is not yet finished, the flow is returned to Step S302 to continue training.

If the training of the duty cycle corrector 22 is finished, then in Step S306, the control circuit 26 records the training result in the storage apparatus 24.

In Step S308, the control circuit 26 updates the duty cycle corrector 22 by the training result recorded in the storage apparatus 24 before a next toggle of the clock signal. The timing before the next toggle of the clock signal includes a timing before performing training on the DCC, a timing after performing training of the DCC and data out, or a timing before performing a next training of the DCC and data out, which will be described in detail below with embodiments, respectively.

Figure 4:
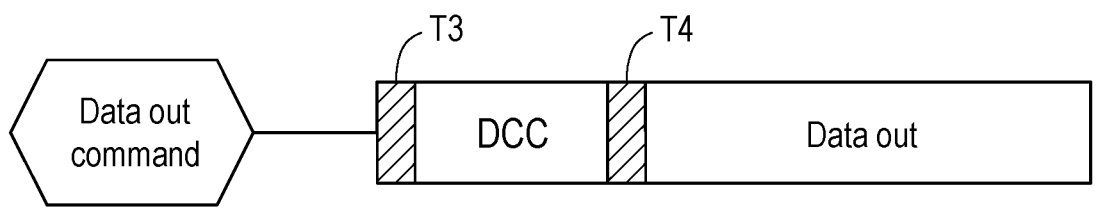
FIG. 4 is an example of a duty cycle correction method according to an embodiment of the disclosure.

FIG. 4 is an example of a duty cycle correction method according to an embodiment of the disclosure. Referring to FIG. 4, when receiving the data out command, the duty cycle correction system updates the duty cycle corrector by using the previously recorded result of the previous training at time T3 before performing training on the duty cycle corrector (DCC), and simultaneously records the results of this DCC training and performs data out at time T4 after DCC training is finished. As a result, a more stable clock can be provided during a toggle of the clock signal.

Figure 5:
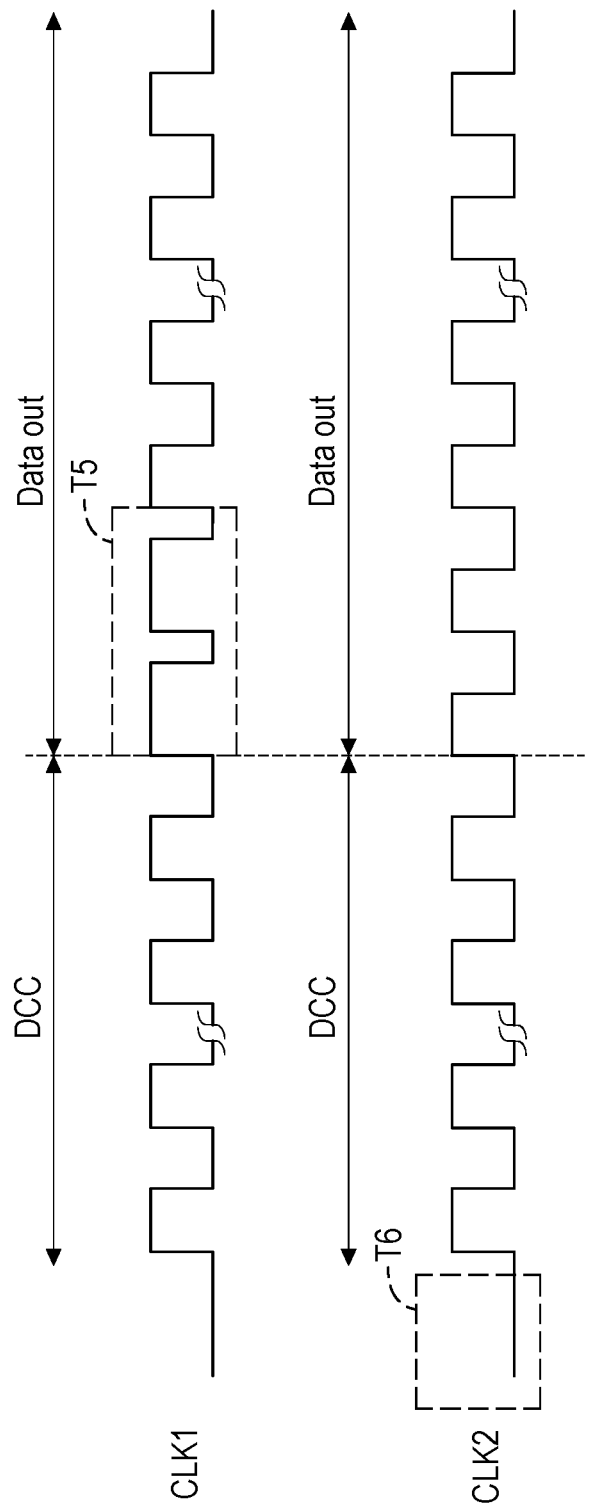
FIG. 5 is a comparative example of a duty cycle correction method according to an embodiment of the disclosure.

In detail, FIG. 5 is a comparative example of the duty cycle correction method according to an embodiment of the disclosure. Referring to FIG. 5, a clock signal CLK1 shows a waveform of the clock signal using the conventional DCC training. The DCC training result is updated and data out is simultaneously performed at time T5 after the DCC training is finished. The updating of the DCC training result causes changes in the duty cycle, which may cause errors in data out. In contrast, a clock signal CLK2 shows a waveform of the clock signal using the duty cycle correction method of the embodiment of the disclosure to perform DCC training, which updates the duty cycle corrector by using the result of the previous DCC training at time T6 before performing the DCC training, and keeps the duty cycle of the clock signal CLK2 unchanged until a next data read command is received, so that a stable clock signal can be provided during the process of DCC training and data out.

Figure 6:
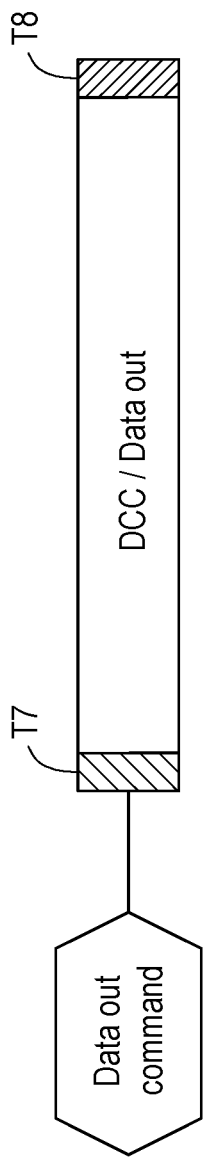
FIG. 6 is an example of a duty cycle correction method according to an embodiment of the disclosure.

FIG. 6 is an example of a duty cycle correction method according to an embodiment of the disclosure. Referring to FIG. 6, when receiving the data out command, the duty cycle correction system updates the duty cycle corrector by the previously recorded result of the previous training at time T7 before performing the training of the DCC and data out. At time T8 after the DCC training and data out are finished, the training result of the DCC is recorded. Therefore, a stable clock can be provided during a toggle of the clock signal.

Figure 7:
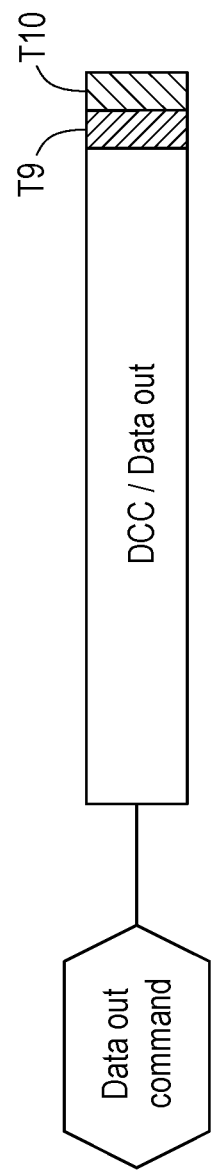
FIG. 7 is an example of a duty cycle correction method according to an embodiment of the disclosure.

FIG. 7 is an example of a duty cycle correction method according to an embodiment of the disclosure. Referring to FIG. 7, when receiving the data out command, the duty cycle correction system performs the training of the DCC and data out simultaneously and records a result of the present DCC training at time T9 after the DCC training and data out are finished, and updates the duty cycle corrector by the recorded DCC training result at time T10. Therefore, a stable clock can be provided during a toggle of the clock signal.

It should be noted that, in the foregoing embodiments, each time the duty cycle correction system 20 receives a data out command, the control circuit 26 first updates the duty cycle corrector 22 by the previous training result recorded in the storage apparatus 24, and when receiving the data out command for the first time, the control circuit 26 updates the duty cycle corrector 22 by using the result of performing training on the duty cycle corrector 22 when the power is turned on.

In detail, when the power of the duty cycle correction system 20 is turned on, the control circuit 26 performs the training on the duty cycle corrector 22 to correct the duty cycle of the clock signal and records an initial training result in the storage apparatus 24 after the training is finished, and when receiving the data out command, the control circuit 26 updates the duty cycle corrector 22 by the initial training result recorded in the storage apparatus 24 before the toggle of the clock signal.

Figure 8A:
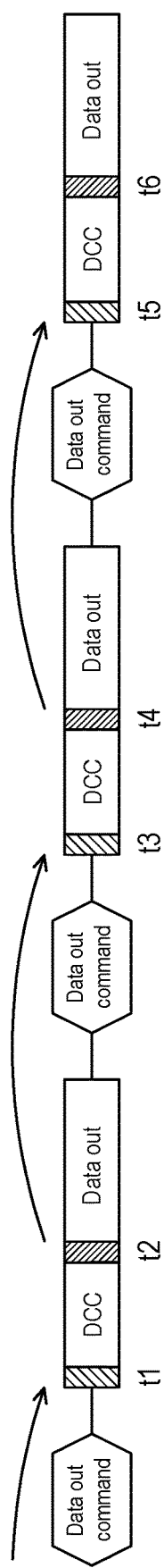
FIG. 8A to FIG. 8C are examples of the duty cycle correction method according to embodiments of the disclosure.
Figure 8B:
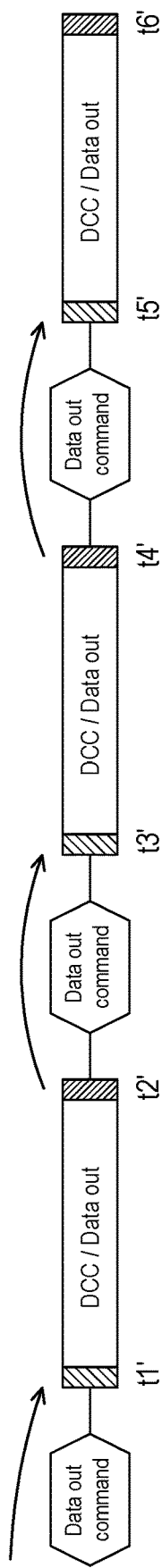
Figure 8C:
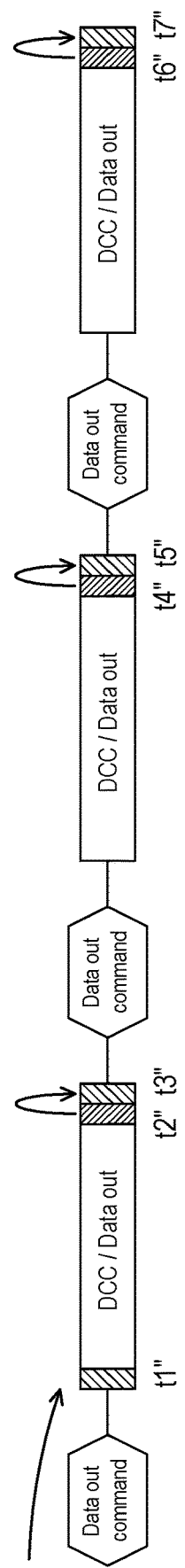

For example, FIG. 8A to FIG. 8C are examples of the duty cycle correction method according to the embodiments of the disclosure. Referring to FIG. 8A, when the power is turned on, the duty cycle correction system performs training on the duty cycle corrector to correct the clock signal and records the initial training result after the training is finished.

When receiving the data out command for the first time, the duty cycle correction system updates the duty cycle corrector by the previously recorded initial training result at time t1 before performing DCC training, and simultaneously records a result of the DCC training this time and performs data out at time t2 after the training is finished. When receiving the data out command for the second time, the duty cycle correction system updates the duty cycle corrector by the DCC training result recorded at time t2 at time t3 before performing DCC training, and simultaneously records a result of the DCC training this time and performs data out at time t4 after the training is finished. When receiving the data out command for the third time, the duty cycle correction system updates the duty cycle corrector by the DCC training result recorded at time t4 at time t5 before performing DCC training, and simultaneously records a result of the DCC training this time and performs data out at time t6 after the training is finished. By analogy, the duty cycle correction system continues operations to perform the DCC training, record the DCC training result, perform data out, and update the duty cycle corrector, so as to continuously provide a stable clock signal.

Referring to FIG. 8B, when the power is turned on, the duty cycle correction system performs training on the duty cycle corrector to correct the clock signal and records the initial training result after the training is finished. When receiving the data out command for the first time, the duty cycle correction system updates the duty cycle corrector by the previously recorded initial training result at time t1' before performing DCC training and data out and records a result of the DCC training this time at time t2' after the DCC training and the data out are finished. When receiving the data out command for the second time, the duty cycle correction system updates the duty cycle corrector by the training result recorded at time t2' at time t3' before performing the DCC training and data out and records a result of the DCC training result this time at time t4' after the training and data out are finished. When receiving the data out command for the third time, the duty cycle correction system updates the duty cycle corrector by the training result recorded at time t4' at time t5' before performing DCC training and data out and records a result of the DCC training this time at time t6' after the DCC training and the data out are finished. By analogy, the duty cycle correction system continues operations to perform the DCC training and data out, record the DCC training result, and update the duty cycle corrector, so as to continuously provide a stable clock signal.

Referring to FIG. 8C, when the power is turned on, the duty cycle correction system performs training on the duty cycle corrector to correct the clock signal and records the initial training result after the training is finished. When receiving the data out command for the first time, the duty cycle correction system updates the duty cycle corrector by the previously recorded initial training result at time t1" before performing DCC training and data out, records a result of the DCC training this time at time t2" after the DCC training and the data out are finished, and updates the duty cycle corrector by the DCC training result recorded at time t3". When receiving the data out command for the second time, the duty cycle correction system first performs the DCC training and data out, records a result of the DCC training this time at time t4" after the DCC training and the data out are finished, and updates the duty cycle corrector by the DCC training result recorded at time t5". When receiving the data out command for the third time, the duty cycle correction system first performs DCC training and data out, records a result of the DCC training this time at time t6" after the DCC training and the data out are finished, and updates the duty cycle corrector by the DCC training result recorded at time t7". By analogy, the duty cycle correction system continues operations to perform the DCC training and the data out, record the DCC training result, and update the duty cycle corrector, so as to continuously provide a stable clock signal.

In summary, according to the embodiments of this disclosure, a duty cycle correction method and a duty cycle correction system are proposed. By modifying the update timing of the training result of the duty cycle corrector, the change of the duty cycle during a toggle of the clock signal can be reduced, thereby reducing the risk of chip functional failure. The training result can be updated at a time when the clock is not toggled, including a timing before performing training on the DCC, a timing after performing the DCC training and the data out, or a timing before performing the next DCC training and data out. Thus, the duty cycle corrector can continuously provide a stable clock signal.

Although the disclosure has been disclosed by the above-mentioned embodiments, the embodiments are not intended to limit the disclosure. It will be apparent to persons having ordinary skill in the art that various modifications and changes can be made in the structures of the disclosure without departing from the scope or spirit of the disclosure. Therefore, the protection scope of the disclosure falls within the scope of the appended claims.

What is claimed is:

1. A duty cycle correction method adapted for correcting a duty cycle of a clock signal by using a duty cycle corrector (DCC), comprising:
    performing control on the duty cycle corrector to correct the clock signal and storing a control result after the control is finished, wherein the duty cycle corrector comprises a sensing circuit and an adjustment circuit, and wherein
        in response to the clock signal being input to the adjustment circuit, the adjustment circuit adjusts the duty cycle of the clock signal and outputs an output clock, and the sensing circuit senses a variation of the output clock to generate a trim value of the duty cycle; and
        the adjustment circuit repeatedly adjusts the duty cycle of the clock signal according to the trim value generated by the sensing circuit to output the output clock, so that the duty cycle of the output clock is trimmed to approximately 50%; and
    updating a delay of the duty cycle corrector by the stored control result before a next toggle of the clock signal.

2. The duty cycle correction method as claimed in claim 1, further comprising:
    performing data out while storing the control result.

3. The duty cycle correction method as claimed in claim 2, wherein updating the duty cycle corrector by the stored control result before the next toggle of the clock signal comprises:
    in response to receiving a next data out command, updating the duty cycle corrector by the stored control result before performing the control on the duty cycle corrector to correct the clock signal.

4. The duty cycle correction method as claimed in claim 1, wherein performing the control on the duty cycle corrector to correct the clock signal and storing the control result after the control is finished comprises:
    performing the control of the duty cycle corrector and data out simultaneously and storing the control result after the control and the data out are finished.

5. The duty cycle correction method as claimed in claim 4, wherein updating the duty cycle corrector by the stored control result before the next toggle of the clock signal comprises:
    in response to receiving a next data out command, updating the duty cycle corrector by the stored control result before performing the control of the duty cycle corrector and the data out.

6. The duty cycle correction method as claimed in claim 4, wherein performing the control of the duty cycle corrector and the data out simultaneously and storing the control result after the control and the data out are finished further comprises:
    updating the duty cycle corrector by the stored control result.

7. The duty cycle correction method as claimed in claim 1, further comprising:
    in response to a power being turned on, performing the control on the duty cycle corrector to correct the clock signal and storing an initial control result after the control is finished; and
    in response to receiving a data out command, updating the duty cycle corrector by the stored initial control result before the toggle of the clock signal.

8. The duty cycle correction method as claimed in claim 1, wherein
    in response to the clock signal being input to the adjustment circuit, the sensing circuit comparing pulse widths of the output clock generated by the adjustment circuit with each other and generating the trim value of the duty cycle according to comparison results.

9. The duty cycle correction method as claimed in claim 1, wherein the duty cycle corrector is configured in a semiconductor product to correct the duty cycle of the clock signal provided to the semiconductor product.

10. A duty cycle correction system, comprising:
    a duty cycle corrector configured to correct a duty cycle of a clock signal, wherein the duty cycle corrector comprises a sensing circuit and an adjustment circuit;
    a storage apparatus configured to store a control result of the duty cycle corrector; and
    a control circuit configured to:
    perform control on the duty cycle corrector to correct the clock signal, and store the control result in the storage apparatus after the control is finished, wherein
        in response to the clock signal being input to the adjustment circuit, the adjustment circuit adjusts the duty cycle of the clock signal and outputs an output clock, and the sensing circuit senses a variation of the output clock to generate a trim value of the duty cycle; and
        the adjustment circuit repeatedly adjusts the duty cycle of the clock signal according to the trim value generated by the sensing circuit to output the output clock, so that the duty cycle of the output clock is trimmed to approximately 50%; and
    update a delay of the duty cycle corrector by the control result stored in the storage apparatus before a next toggle of the clock signal.

11. The duty cycle correction system as claimed in claim 10, wherein
the control circuit further performs data out while storing the control result.

12. The duty cycle correction system as claimed in claim 11, wherein
in response to receiving a next data out command, the control circuit comprises updating the duty cycle corrector by the stored control result before performing the control on the duty cycle corrector to correct the clock signal.

13. The duty cycle correction system as claimed in claim 10, wherein
the control circuit comprises performing the control of the duty cycle corrector and data out simultaneously and storing the control result in the storage apparatus after the control and the data out are finished.

14. The duty cycle correction system as claimed in claim 13, wherein
in response to receiving a next data out command, the control circuit comprises updating the duty cycle corrector by the stored control result before performing the control of the duty cycle corrector and the data out.

15. The duty cycle correction system as claimed in claim 13, wherein
the control circuit further updates the duty cycle corrector by the stored control result after storing the control result.

16. The duty cycle correction system as claimed in claim 10, wherein
the control circuit further performs the control on the duty cycle corrector to correct the clock signal and stores an initial control result after the control is finished in response to a power being turned on, and updates the duty cycle corrector by the stored initial control result before the toggle of the clock signal in response to receiving a data out command.

17. The duty cycle correction system as claimed in claim 10, wherein
in response to the clock signal being input to the adjustment circuit, the sensing circuit compares pulse widths of the output clock generated by the adjustment circuit with each other and generates the trim value of the duty cycle according to comparison results.

18. The duty cycle correction system as claimed in claim 10, wherein the duty cycle corrector is configured in a semiconductor product to correct the duty cycle of the clock signal provided to the semiconductor product.

* * * * *